United States Patent Office 3,164,146
Patented Jan. 5, 1965

3,164,146
HEATING DEVICES OPERATED WITH
LIQUID FUEL
Reiner Friedl, Starnberg, Upper Bavaria, and Robert von
Linde, Grafelfing, near Munich, Germany, assignors to
Webasto Werk G.m.b.H., Stockdorf, near Munich,
Germany
Filed Apr. 1, 1963, Ser. No. 271,835
Claims priority, application Great Britain Mar. 9, 1960
1 Claim. (Cl. 126—116)

This invention relates to heating devices, e.g., for use in motor vehicles, of the kind provided with a combustion chamber, supplied with a mixture of liquid fuel and combustion air by a positive displacement pump, wherein said pump furnishes all the air necessary for combustion.

Heating devices of this type are small and free from interference by draughts at the exhaust outlet caused by driving, and are thus very steady in operation. Another advantage of this type is that long exhaust pipes may be used, which substantially decreases installation problems.

It is an object of the present invention to provide a suitable combustion chamber for the aforesaid type of heating device in which, compared with high pressure or low pressure burners, a small cross section of the supply pipe is used, and therefore a high velocity of flow is attained.

According to the invention the combustion chamber is provided with an annular space into which the supply pipe leading from the positive displacement pump is discharged.

Another feature of the invention consists in using a lateral discharge of the supply pipe into the annular combustion space. Said discharge is preferably so disposed that the mixture of fuel and combustion air streaming in does not flow tangentially into the combustion chamber but is at least partially directed against the inner wall of the annular combustion space.

The mixture of fuel and combustion air may be fed into the annular combustion chamber parallel to its axis, if a guiding device is provided in said chamber which directs a flow component perpendicular to said axis.

It is important, as regards the stream characteristic, that the annular combustion chamber shall be followed by a tubular space. In this construction a convenient arrangement for the ignition of the burner consists in providing an electric ignition device at the transition point of the annular combustion chamber and the tubular space. The wires for the ignition device may be, and preferably are, disposed within the central space formed by the inner wall of the annular part of the combustion chamber.

Another very convenient feature with respect to the cleaning of the combustion chamber (which, if the proposed ignition device is used, includes the possibility of changing the latter) is that the inner wall of the annular part of the combustion chamber may be releasably fixed at the front end of the combustion chamber.

As regards the flow characteristics and the possibility of cleaning, the heating device according to the invention may be further improved by attaching a tubular channel to the tubular part of the combustion chamber, which channel extends through a heat exchanger and, together with the combustion chamber, has a substantially linear axis.

The location of the flame face in the combustion chamber is of importance, because it (and more especially its annular portion) may become easily overheated. For this reason it is preferred to use a cross-sectional area for the annular combustion chamber which is at most eight times, and preferably less than six times, but more than double, the cross-sectional area of the supply pipe leading from the positive displacement pump. Moreover, the dangers referred to may be decreased by cooling the annular part of the combustion chamber with a forced cooling draught. To attain high flow velocities, and therefore a good heat exchange, the cooling draught may be set up from air sucked in by the positive displacement pump. This arrangement may be also used for muffling the displacement pump by suitable construction, which will be described more fully below.

To secure an efficient turbulence and mixing of the supplied fuel and combustion air within the annular part of the combustion chamber (which normally is located before the front line of the flame), the annular combustion chamber may be formed by two cylindrical walls of a length, preferably at least one and a half times the diameter of the inner cylindrical wall.

The novel features which are considered as characteristic for the invention are set forth in particular in the appended claim. The invention itself, however, both as to its construction and its method of operation, together with additional objects and advantages thereof, will be best understood from the following detailed description of a specific embodiment when read in connection with the accompanying drawings, in which:

Figure 1:
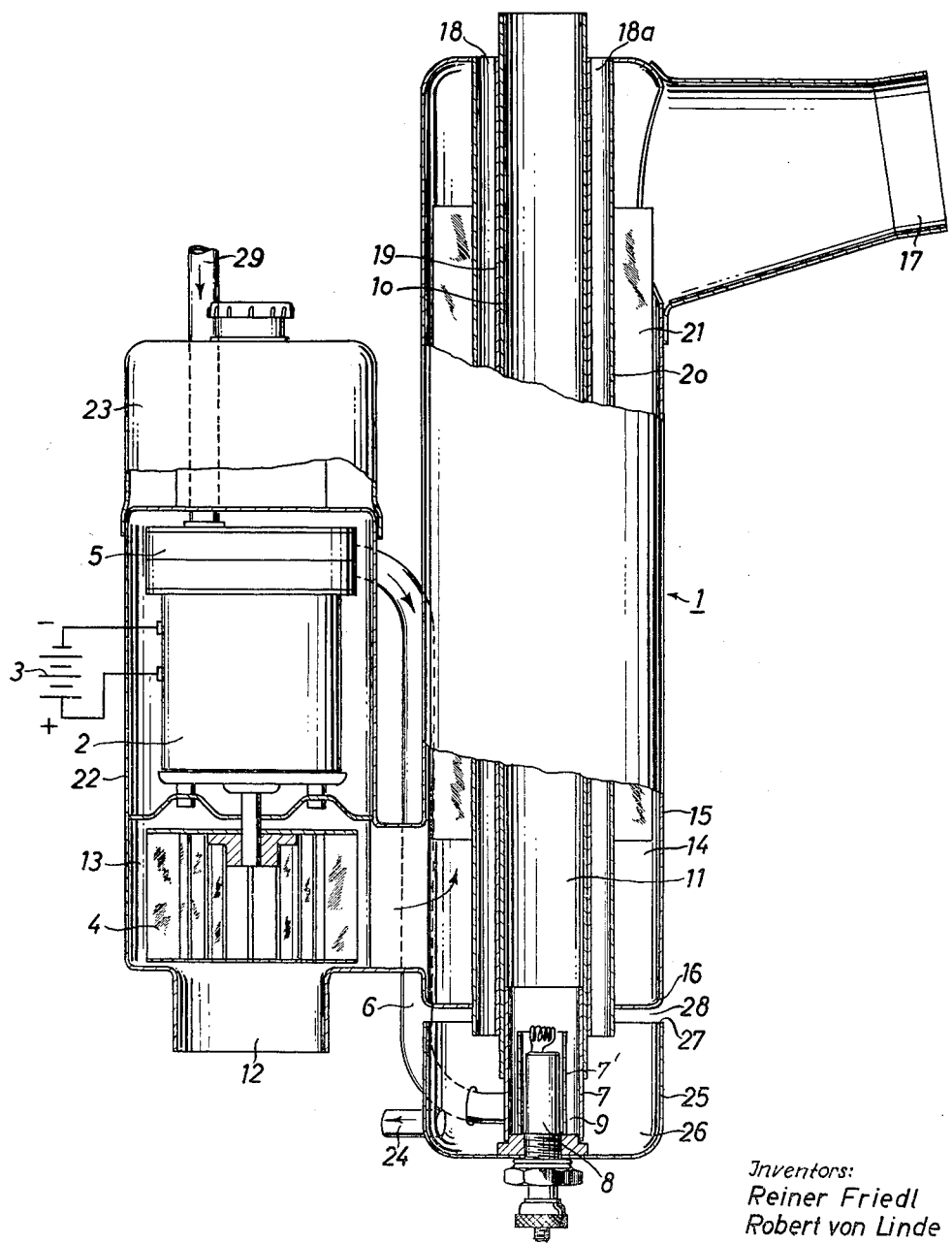
FIG. 1 is a longitudinal section through a heater embodying this invention.

Referring now in greater detail to the illustrated embodiment, and first to FIG. 1, there is shown an automobile heater which comprises a heat exchanger 1 located adjacent to an electric driving motor 2, the latter receiving current from a rechargeable battery 3 to rotate a blower 4 which delivers atmospheric air to the heated component of the heat exchanger 1. The motor 2 also drives a special pump 5 whose pressure side delivers a fuel-air mixture through a supply conduit 6 and only into a burner 7 which comprises an electric glow plug 8 extending into the combustion chamber 9. The combustion chamber 9 is generally defined by the inner surface of the cylindrical burner wall 7 and the outer surface of a cylindrical wall 7' which surrounds the glow plug 8. The length of the combustion chamber 9 is typically of the order of one and a half times the diameter of the cylinder defined by the wall 7'. Also the cross-sectional area of the combustion chamber 9 is typically in the range of from twice to eight times the cross-sectional area of the supply conduit 6. The elongated cylindrical pipe 10 constitutes the heating component of the heat exchanger 1 and defines a heating channel 11 whose forward end receives the burner 7, preferably in such a way that the burner may be readily separated therefrom. Owing to its extremely simple form, the heating pipe 10 may be manufactured at a very low cost and may be readily cleaned upon removal of the burner 7. The discharge end of the heating pipe is connected to the exhaust pipe of the automobile not shown.

The atmospheric air drawn by the blower 4 through the intake opening 12 flows through the annular space 13 which surrounds the blading of the blower and thence into a hot-air channel 14 which is defined by the heated component of the heat exchanger 1 here shown as a tubular member 15 coaxially surrounding the heating pipe 10. The forward end of the hot-air channel 14 is closed, as at 16. The discharge opening 17 of the tubular heated component 15 is connected with suitable piping (not shown) which leads to the passenger compartment of the conveyance. It will be noted that the annular space 13 communicates with the hot-air channel 14 at a point close to the burner 7 so that the air is heated throughout the full length of the tubular member 15.

The safety channels 18, 18a formed between the heating channel 11 and the hot-air channel 14 by two coaxial annular walls 19, 20 and by a series of radial webs (not shown) prevent the escape of combustion products from the channel 11 into the channel 14 in the event of a leak in the heating component 10. The outer annular wall 20 supports a series of radial heat radiating ribs 21 which extend into the hot-air channel 14 to enhance the action of the heat exchanger.

Figure 2:
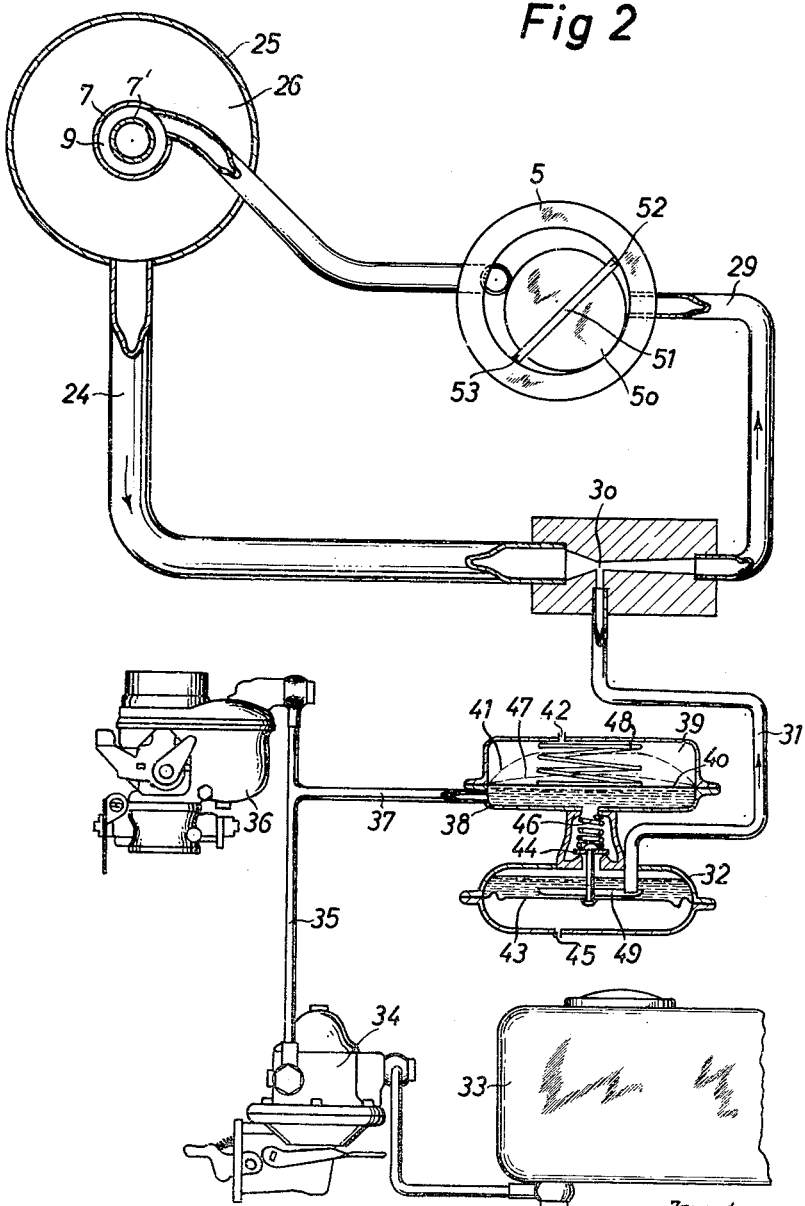
FIG. 2 is a partly elevational and partly sectional view of a system which supplies a fuel-air mixture to the burner of the heater shown in FIG. 1.

The battery-operated electric motor 2, the blower 4 and the pump 5 are received in a housing 22 which is connected with a casing 23 for the electrical control elements of the heater. The suction side of the pump 5 draws preheated air through an intake line 24 which communicates with a cup-shaped mantle 25 defining an annular compartment 26 surrounding the combustion chamber 9 of the burner 7. The opening 27 of the mantle 25 is adjacent to the closed end 16 of the hot air tube 15, there being formed a gap 28 which permits entry of atmospheric air through the opening 27, into the compartment 26, and through the intake line 24 to the suction side of the pump 5. As is shown in FIG. 2, the intake line 24 is connected with a conduit 29 through an injector 30 which is installed at the junction of line 24 with conduits 29, 31. This injector delivers into the conduit 29 liquid fuel drawn from a source or reservoir 32 through the suction conduit 31.

The main supply of liquid fuel is stored in the gasoline tank 33 of the automotive vehicle and is drawn by the main fuel pump 34 through a line 35 leading to the carburator 36. A branch 37 connects the line 35 with an auxiliary tank 38. The fuel-filled lower portion of the auxiliary tank 38 is separated from the air-filled upper portion 39 by a strongly flexible diaphragm 40 which is progressively deformed when the pump 34 delivers fuel through the branch line 37 and the heater is not in use, i.e., when the conveyance is driven but the heater need not be operated. When the auxiliary tank 38 is completely filled with liquid fuel, the diaphragm 40 assumes an extreme or end position 41 which is shown in broken lines. The upper portion 39 of the auxiliary tank 38 communicates with the atmosphere through a port 42.

When the engine of the automobile is stopped by the heater remains in operation, the suction conduit 31 delivers fuel from the source or reservoir 32 to the injector 30 so that a vacuum develops in the reservoir 32 causing the diaphragm or membrane 43 to be deformed upwardly toward the fluid-filled lower portion of the auxiliary tank 38. The membrane 43 is connected with the stem of a one-way valve 44 which then moves away from its seat and permits the flow of fuel into the reservoir 32. The membrane 43 divides the interior of the reservoir 32 into an air-filled lower space which communicates with the atmosphere through a port 45, and into a fuel-receiving upper space which communicates with the fuel-filled portion of the auxiliary tank 38 when the valve 44 is in open position. The latter is permanently biased into sealing position by a helical resilient element 46. When the fuel is permitted to flow from the tank 38 into the reservoir 32, the diaphragm 40 moves from the position 41 or the position 47 toward its full-line position until the fuel filling the upper space in the reservoir 32 causes the membrane 43 to return the valve 44 into sealing position.

The action of the valve 44 is analogous when the heater is operated simultaneously with the automobile engine, i.e., when the electric motor 2 and the fuel pump 34 operate at the same time. The auxiliary tank 38 is then refilled in a continuous way so that the diaphragm 40 always remains in its broken-line position 41.

The arrangement of parts in the tank 38 is preferably such that this tank may be completely evacuated when the automobile engine is idle. This can be attained by providing in the air-filled upper portion 39 of the tank 38 a spring 48 which biases the diaphragm 40 toward the valve 44 so that the diaphragm will ultimately seal the fuel passage leading to the valve 44 when the fuel-filled lower portion of the tank 38 is evacuated.

A further feature of this invention resides in the provision of a shallow tray-shaped receptacle 49 which is mounted in the fuel-receiving upper space of the reservoir 32 and is disposed beneath the fuel passage which is normally sealed by the valve 44. Thus, whenever the valve 44 opens, the fuel fills the receptacle 49 first and, since the intake end of the suction conduit 31 extends into the receptacle, the latter will deliver fuel to the injector 30 even if the reservoir is tilted from horizontal position and even if the upper space of this reservoir is nearly completely evacuated. The receptacle 49 is preferably located immediately adjacent to the upper side of the membrane 43. Also, contrary to the showing of FIG. 2, the intake end of the suction conduit 31 is preferably located close to the center of the receptacle 49.

As is shown in FIG. 2, the displacement pump 5 is preferably of the vane type and the number of vanes is less than four. The pressure side of this pump delivers the fuel-air mixture only to the burner 7. In its preferred form, the pump comprises a rotor 50 which is driven by the electric motor 2 and which slidably mounts a diametral blade 51 defining two vanes 52, 53. These vanes sealingly engage with the cylindrical housing of the pump 5 only in a single position thereof which is illustrated in FIG. 2, this being due to the fact that the rotor 50 is eccentric with respect to the pump housing. In all other positions of the rotor 50, only one of the vanes 52, 53 will sealingly engage with the cylindrical inner surface of the pump housing. For example, and assuming that the rotor 50 is driven in clockwise direction, the vane 53 will remain in sealing engagement with the pump housing during the first revolution and the other vane 52 will seal during the next revolution. Such arrangement reduces frictional losses by nearly 40 percent while the pump output is reduced to a much lesser extent.

Because the air drawn through the gap 28 into the compartment 26 surrounds the combustion chamber 9, the burner 7 is protected against excessive heating and its combustion chamber may be comparatively short to thus reduce the overall length of the heater and to improve the flow of combustion products in the chamber 11. Moreover, the provision of the mantle 26 and of the annular gap 28 for entry of air which is led to the pump 5 reduces the noise without reducing the efficiency of the heater.

It has been found that for favorable streaming conditions and a good development of the flame, the diameter of the cylindrical combustion chamber or channel 11 should preferably not be smaller than the outer diameter of the annular combustion chamber 9 into which the fuel-air mixture is fed; and the channel 11 should not be larger than one and one half times the outer diameter of the chamber 9.

Further, it should be mentioned that preferably the length of the channel 11 should be at least twice its diameter.

By proper selection of the injector 30, the fuel-air mixture may be varied as desired to thereby influence the efficiency of the heater. As is known, the production of soot rises if the efficiency increases so that a median efficiency must be selected at which the generation of soot is not excessive. Since the atmospheric and climatic conditions have very little or no influence on the operation of the improved heater, its efficiency may remain very high without risking excessive formation of soot as would be the case were the heater operated by an internal combustion engine. Thus, the provision of a battery-operated motor for the pump of the heater renders it possible to operate the heater at a higher efficiency without excessive sooting and without in any way depending on the operation of the automobile engine.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claim.

This application is a continuation-in-part application of our earlier filed application Serial No. 91,228 filed February 23, 1961, entitled "Heating Devices Operated with Liquid Fuel" and now abandoned.

What is claimed as new and desired to be secured by Letters Patent is:

A liquid fuel operated heating device comprising in combination:
- a heat exchanger including means defining a first channel having a circular cross-sectional area for combustion gases and means defining a second channel having an annular cross-sectional area substantially surrounding said first channel for a heat transfer medium;
- a burner, said burner including a chamber having an annular cross-sectional area coaxial with said first channel and communicating therewith, said chamber being formed by a pair of coaxially arranged cylindrical wall members, the inner one of said wall members projecting within and spaced from the outer one of said wall members, and thereby defining a first annular zone of one volume between the outer surface of the inner surface of the outer wall member and a second cylindrical zone of an increased volume defined by the inner surface of the outer wall member, said first zone being in communication with said second zone, the means defining said first channel forming a generally lineal axial extension of the outer wall member, and means for igniting fuel disposed coaxially within the inner wall member;
- a positive displacement pump for furnishing the total air and fuel necessary for combustion to said burner, said pump having a pressure side and a suction side; driving means for said positive displacement pump; and
- a supply pipe connected to the pressure side of said positive displacement pump and with a discharge into said annular chamber within the first annular zone between the outer surface of the inner wall member and the inner surface of the outer wall member.

References Cited in the file of this patent
UNITED STATES PATENTS

| | | |
|---|---|---|
| 2,410,353 | McCollum | Oct. 29, 1946 |
| 2,489,716 | McCollum | Nov. 29, 1949 |
| 2,617,399 | Backus | Nov. 11, 1952 |
| 2,779,398 | Brown | Jan. 29, 1957 |
| 3,008,642 | Kofink et al. | Nov. 14, 1961 |
| 3,016,893 | Brown | Jan. 16, 1962 |
| 3,028,855 | Brown | Apr. 10, 1962 |
| 3,071,183 | Rou | Jan. 1, 1963 |